United States Patent
Roble et al.

(10) Patent No.: US 8,872,832 B2
(45) Date of Patent: Oct. 28, 2014

(54) SYSTEM AND METHOD FOR MESH STABILIZATION OF FACIAL MOTION CAPTURE DATA

(75) Inventors: Douglas Roble, Culver City, CA (US); John Cooper, Los Angeles, CA (US); Steve Preeg, Los Angeles, CA (US)

(73) Assignee: Digital Domain 3.0, Inc., Venice, CA (US)

( * ) Notice: Subject to any disclaimer, the term of this patent is extended or adjusted under 35 U.S.C. 154(b) by 895 days.

(21) Appl. No.: 12/635,929

(22) Filed: Dec. 11, 2009

(65) Prior Publication Data

US 2010/0156910 A1 Jun. 24, 2010

Related U.S. Application Data

(60) Provisional application No. 61/138,924, filed on Dec. 18, 2008.

(51) Int. Cl.
G06T 13/00 (2011.01)
G06T 13/40 (2011.01)
G06T 7/20 (2006.01)

(52) U.S. Cl.
CPC ....... G06T 13/40 (2013.01); G06T 2207/10016 (2013.01); G06T 2207/30201 (2013.01); G06T 7/208 (2013.01); G06T 7/2046 (2013.01)
USPC ....................................................... 345/473

(58) Field of Classification Search
CPC ....................... G06T 7/208; G06T 2207/30201
USPC ....................................................... 345/473
See application file for complete search history.

(56) References Cited

U.S. PATENT DOCUMENTS

| 7,349,583 B2 * | 3/2008 | Kumar et al. | 382/294 |
| 2001/0033675 A1 * | 10/2001 | Maurer et al. | 382/103 |
| 2008/0024505 A1 * | 1/2008 | Gordon et al. | 345/473 |

OTHER PUBLICATIONS

James J. Lien et al., "Automated Facial Expression Recognition Based on FACS Action Units," IEEE published in Proceeding of FG 1998 in Nara Japan.*

* cited by examiner

*Primary Examiner* — Kee M Tung
*Assistant Examiner* — Peter Hoang
(74) *Attorney, Agent, or Firm* — Perkins Coie LLP

(57) ABSTRACT

A method and system for removing head motion from facial motion capture data. The method includes receiving a set of measured points of a target model, wherein each point is associated with coordinates in a 3D space. The method includes computing an optimal affine transformation function. The computing includes selecting an unprocessed point from the set of measured points. The computing includes selecting two nearby neighboring points of the unprocessed point. The computing includes computing an affine transformation function that minimizes an L2-norm error. The computing includes identifying the optimal affine transformation function from a set of computed affine transformation functions. The method includes displaying an aligned target model and reference model utilizing the optimal affine transformation function. The method includes outputting the optimal affine function to a computer-readable storage medium.

24 Claims, 6 Drawing Sheets

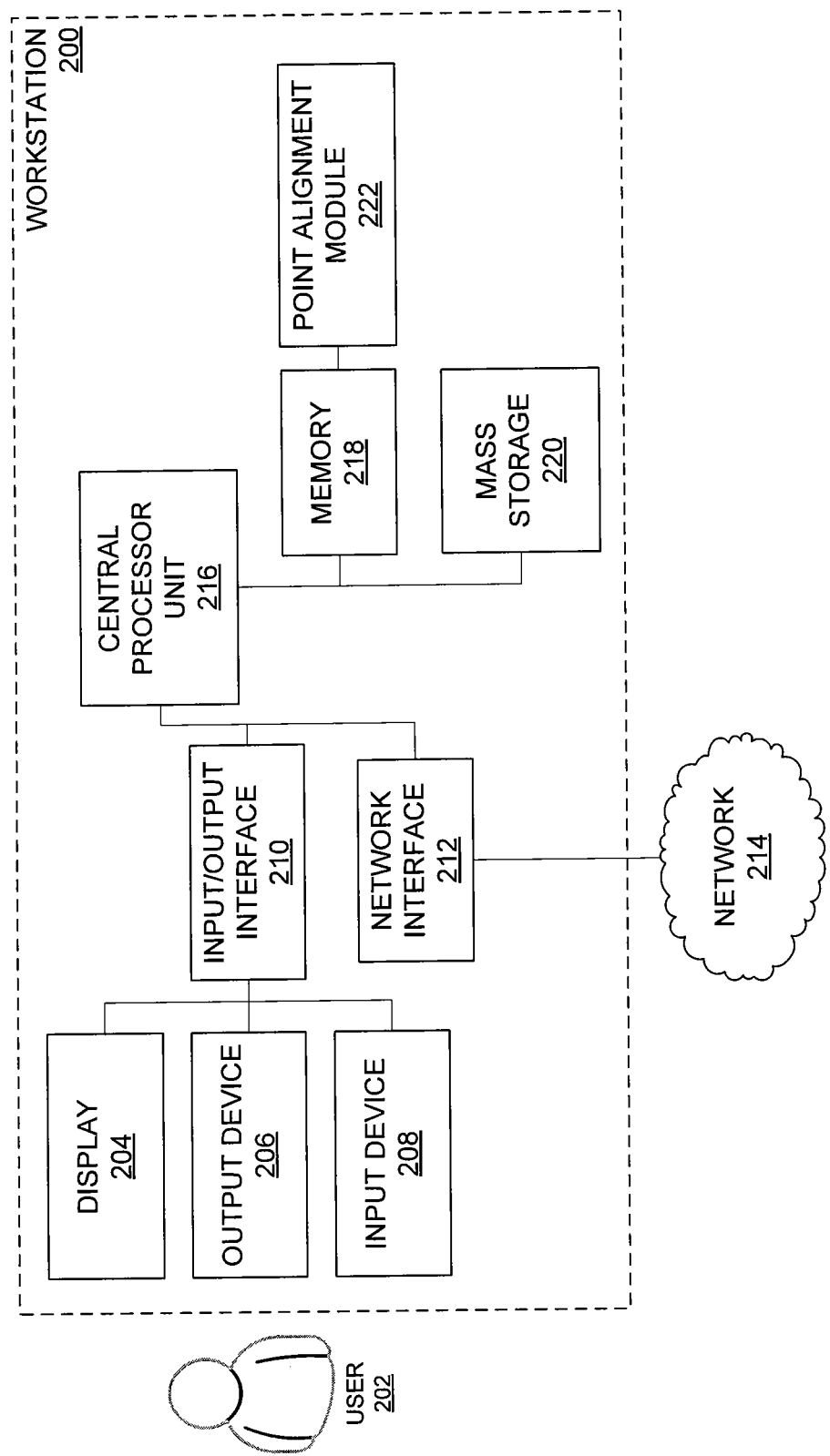

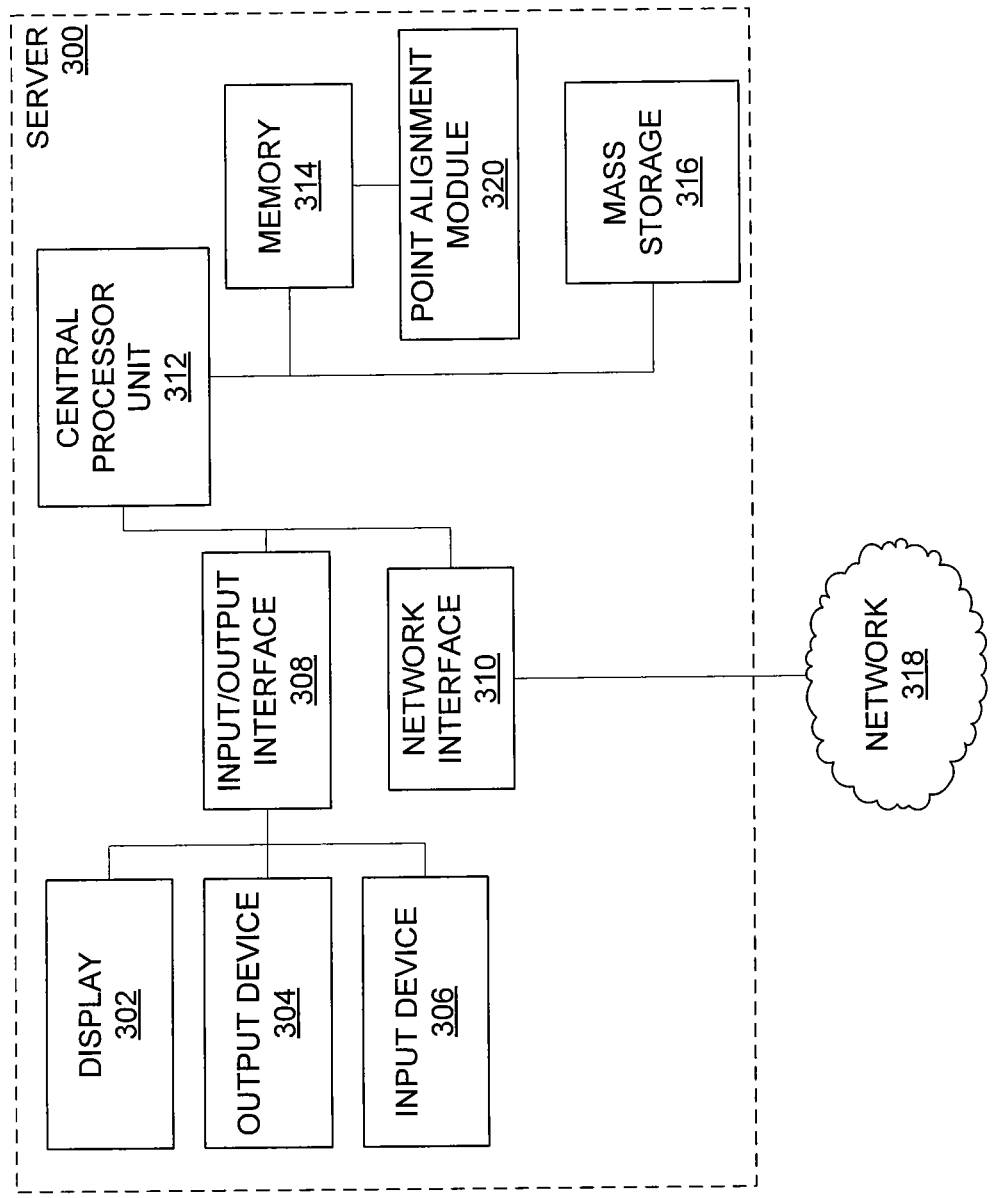

400

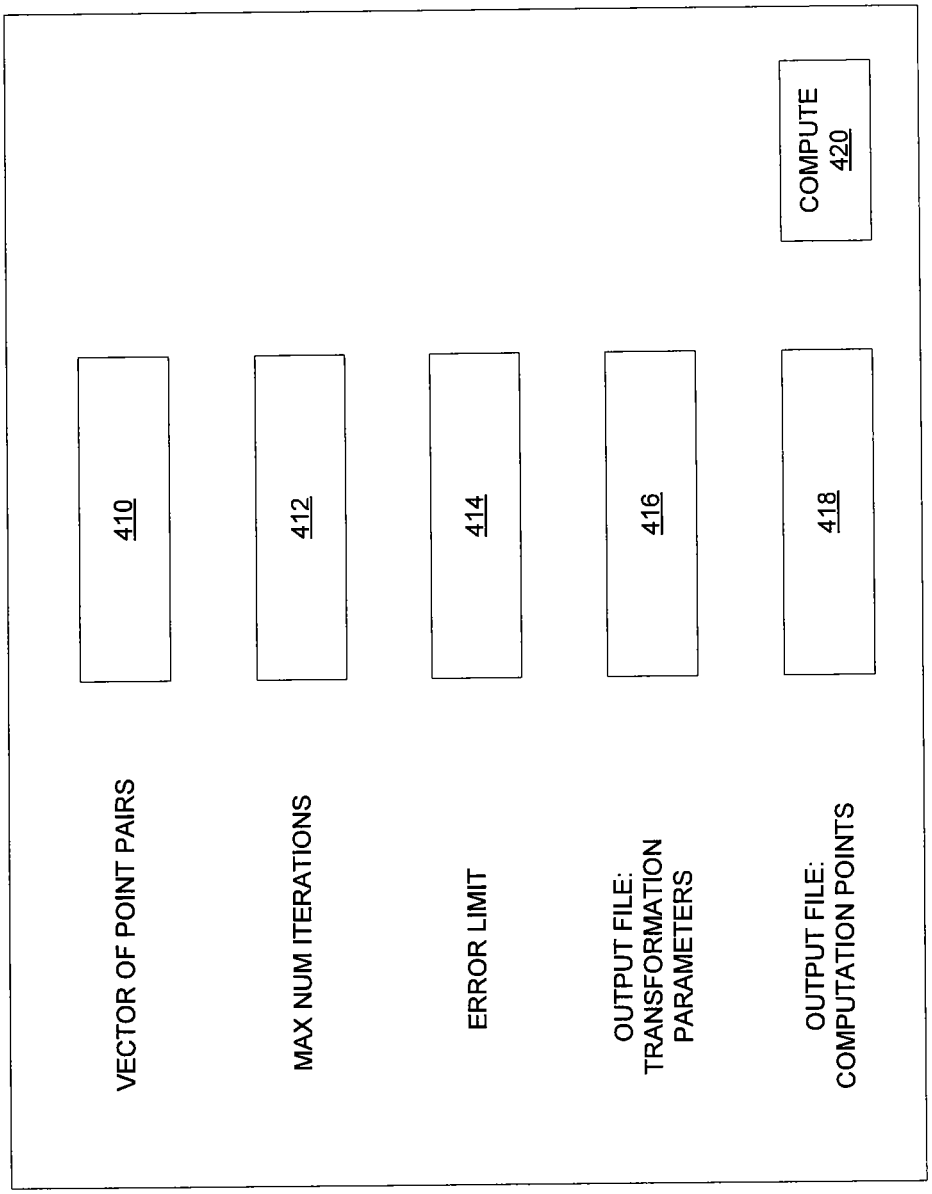

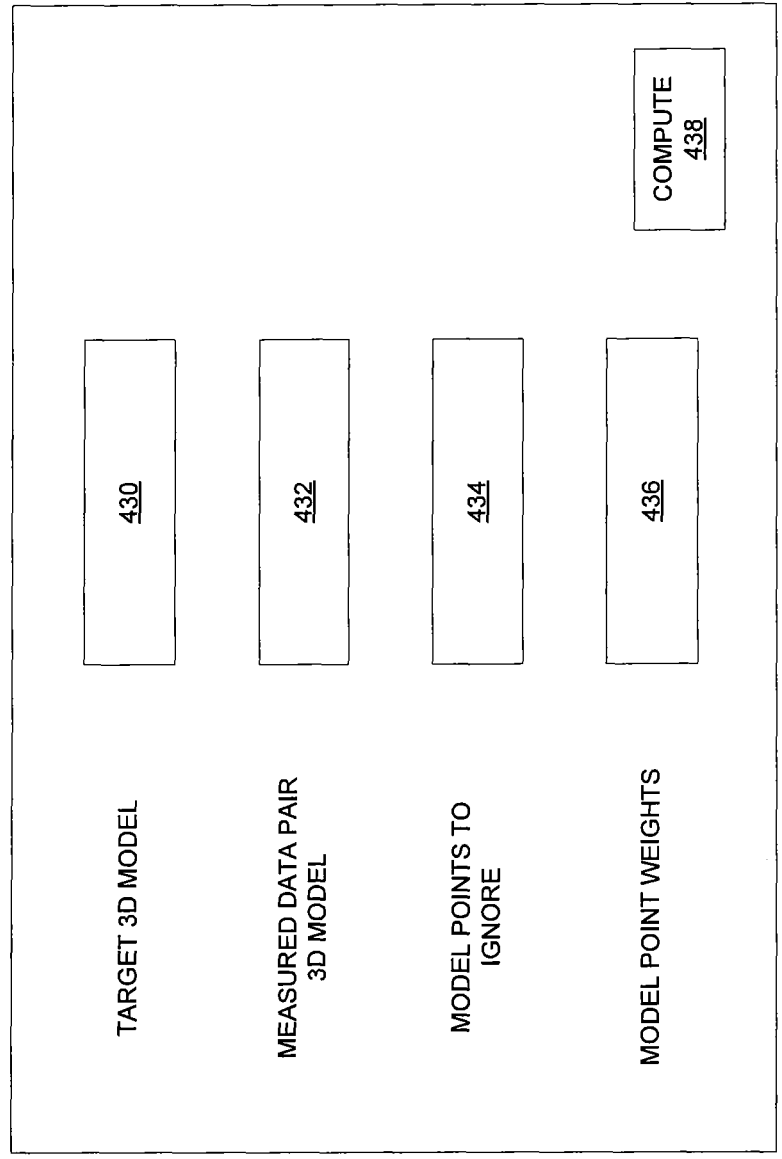

SYSTEM AND METHOD FOR MESH STABILIZATION OF FACIAL MOTION CAPTURE DATA

CROSS REFERENCE TO RELATED APPLICATIONS

This application claims priority to U.S. Provisional Application No. 61/138,924 entitled "SYSTEM AND METHOD FOR MESH STABILIZATION OF FACIAL MOTION CAPTURE DATA" filed on Dec. 18, 2008, and which is incorporated herein by reference.

BACKGROUND OF THE INVENTION

In a facial motion capture pipeline, the motion of an actor's face is used to drive an animated model of the actor's face. In one embodiment of the pipeline, an actor is filmed with multiple cameras and marks on his face in a motion capture session. Using a variety of processes, the marks are converted to animated 3D points in space. This information is then used to drive an animation rig or model created by artists from a high resolution scan of the actor's face. With the animation information of the 3D points in space, the actor's face can be animated in a life-like manner.

It is desirable for the actor to keep his head steady and stable during the motion capture session. When attempting to animate the animation model, facial motion capture ideally captures only actor facial motions, not head motions. Head movements are animated at a later stage in the animation process.

Unfortunately, it is difficult for an actor to act while keeping his head and face completely stable. Thus, every motion capture session includes removing the motion of the head from the captured motion of the individual marks on the actor's face. This process can be difficult because the face is constantly moving and deforming. Furthermore, there are no fixed landmarks on the human face that can be used to compute the overall affine transformation of the head.

Prior approaches included either a laborious hand positioned alignment by trained artists of the 3D points or by tracking the 3D location of points on the head that were deemed "stable enough." Neither of these techniques produces consistent results. In the hand-stabilization approach, the results vary greatly depending on the skill of the artist and the time spent on the project. In the track-the-most-stable-markers approach, significant error results because no part of the face is completely stable.

Horn's orientation/alignment algorithm discusses a method for a relationship between two coordinate systems using pairs of measurements of the coordinates of a number of points in both systems and is described in Berthold K. P. Horn "Closed Form Solution of Absolute Orientation using Unit Quaternions," Journal of the Optical Society of America, Vol. 4, pp. 629-42, April 1987, which is hereby incorporated in its entirety.

Random Sample and Consensus (RANSAC) discusses a method for fitting a model to experimental data that is capable of interpreting and smoothing data containing a significant percentage of gross errors and is described in Fischler, M. A. and Bolles, R. C. "Random Sample Consensus: A Paradigm for Model Fitting with Applications to Image Analysis and Automated Cartography" Readings in Computer Vision: Issues, Problems, Principles, and Paradigms, M. A. Fischler and O. Firschein, Eds. Morgan Kaufmann Readings Series. Morgan Kaufmann Publishers, San Francisco, Calif., 726-740, 1981, which is hereby incorporated in its entirety.

Thus, there is a need to compute the global head transformation during a motion capture session based on only the points on the face.

BRIEF DESCRIPTION OF THE DRAWINGS

The features and objects of the present disclosure will become more apparent with reference to the following description taken in conjunction with the accompanying drawings wherein like reference numerals denote like elements and in which:

FIG. 2 illustrates an example workstation for removing head motion from facial motion capture data.

FIG. 3 illustrates an example server for removing head motion from facial motion capture data.

FIG. 4B illustrates a first example screen shot of a user interface.

FIG. 4C illustrates a second example screen shot of a user interface.

DETAILED DESCRIPTION

A method and system for removing head motion from facial motion capture data is provided. Facial motion is captured through camera and markers on an actor's face. The facial motion capture data is processed with Horn's orientation/alignment algorithm to find a relationship between two coordinate systems. Random Sample and Consensus (RANSAC) is used to fit a model to the captured facial motion data, wherein RANSAC is capable of interpreting and smoothing data containing a significant percentage of gross errors. This produces facial motion capture data without actor head motions, which can be used to animate a model of the actor's face.

In one embodiment, the techniques described herein can be implemented in the C++ programming language. In one embodiment, the user interface aspects can be implemented in the Maya Animation Package (sold by AutoDesk). In one embodiment, the program can be written to be easily parallelized by an Intel C++ Compiler.

It will be appreciated that the techniques described herein can be used to stabilize any deforming motion. In one example, markers can be placed on an actor's face in multiple recording sessions occurring on different days. Each session can include markers that are not in the exact position as the previous session. The techniques described herein can be used to determine a transformation that will align a session's marker locations with a previous session's marker location. This greatly reduces error between motion capture sessions.

In will be appreciated that the techniques described herein can be used in applications beyond motion capture, for example, to compute the best fit between two sets of data that have changed over time. The data can be any dimensionality. In this example, motion capture data is 3D data with each location indicated by an (x, y and z). But the systems and methods can easily be applied to image data (x, y) or even to data mining applications where the data is of a high dimension. For instance, given market data, the techniques described herein can be used to compute the overall stock market change that looks beyond small, individual motion of individual stock or bond changes.

Figure 1:
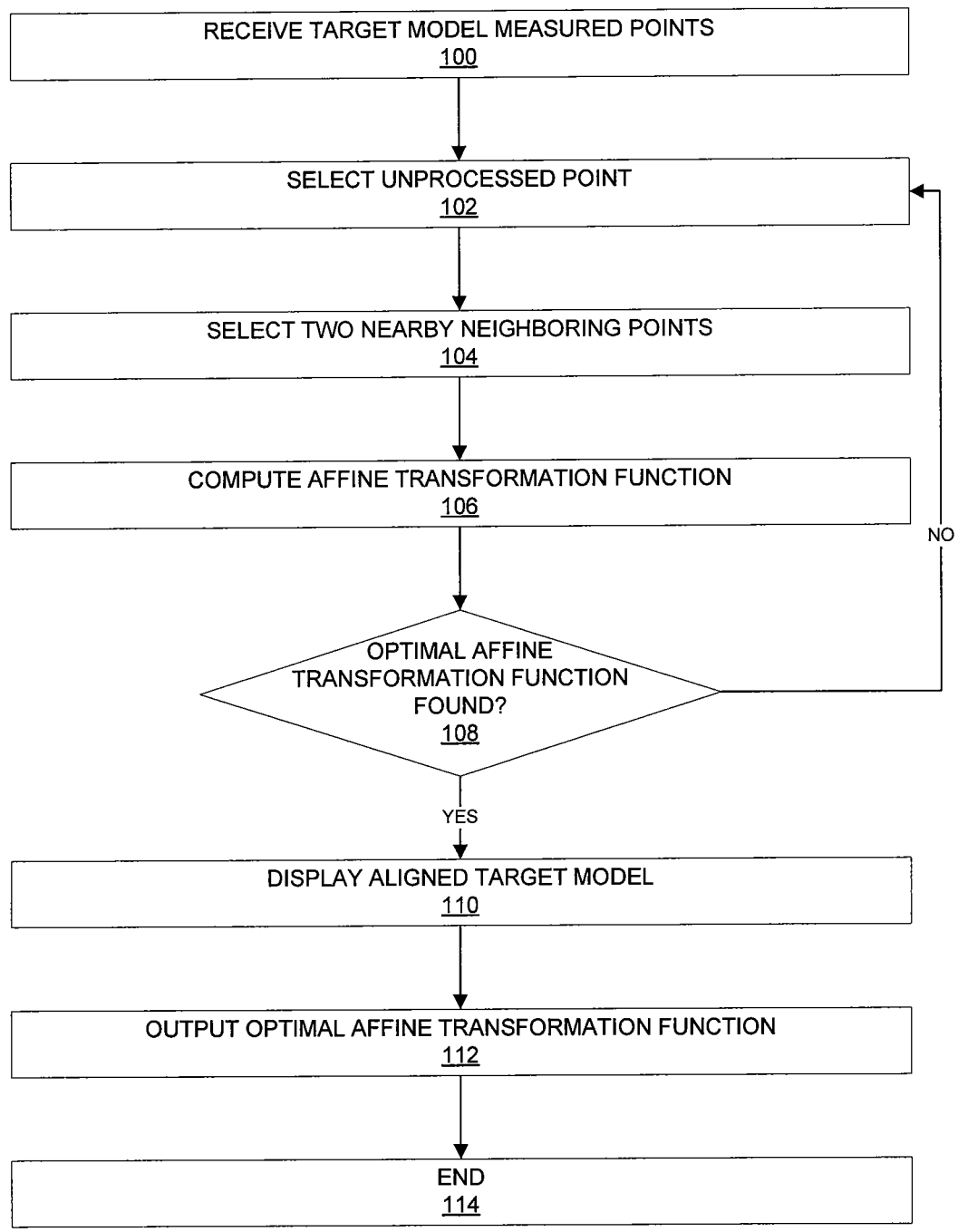
FIG. 1 illustrates an example procedure for removing head motion from facial motion capture data.

FIG. 1 illustrates an example procedure for removing head motion from facial motion capture data. The procedure can execute on a workstation as illustrated in FIG. 2, a server as illustrated in FIG. 3, or a combination of a workstation and a server.

In one embodiment, a first phase is point alignment. In 100, a set of target model measured points is received. For example, the measured points can be points recorded during a recording session from markers on an actor's face. In this example, the measured points are coordinates within a 3D space.

Given a set of n-dimensional target points and a set of n-dimensional measured points, an affine transformation is applied to the measured points minimizing the L2-norm error between corresponding measured/target points. An optimized version of Horn's solution (discussed above) can be used to solve this problem.

In one embodiment, a second phase is robust point location. Simply minimizing the L2-norm between the corresponding points (discussed above) will produce inaccurate results because the entire set of points is undergoing some local deformation (e.g., actor head or facial movements). The second phase attempts to find the set of points that have moved the least and removes the points that have moved/deformed too much from the point alignment computations.

The transformation is computed using RANSAC, a technique to find the best fit of data given noisy inputs. In RANSAC, the minimal data set needed to compute the error is permutated and a test is run to see if the each permutated set of data produces a better result as determined by a cost function.

Horn's algorithm requires at least three points. Assuming a point has not deformed or moved from its rest position, there is a high probability that the point's neighbors also have not deformed or moved. By choosing one point from the measured set of points and also selecting the point's neighbors, the universe of the possible point combinations to be tested is reduced significantly. This can be computed during the "Random Sample" part of the RANSAC search procedure. In 102, an unexamined random point is selected. In 104, two nearby neighboring points of the unexamined random point are selected. The neighboring points cannot be too close together; otherwise Horn's algorithm will not generate stable results. For example, a user- or programmer-specified lower threshold can determine a minimum distance between the neighboring points, or a distance function that must be satisfied by the neighboring points.

The three points and their corresponding target points are fed to the Horn's algorithm and an affine transformation function is computed in 106. The transformation function is used to measure the overall error of the alignment. If this is better than the current best affine transformation, the current seed point is promoted to the best seed point. In 108, the affine transformation function associated with the best seed point is tested to be optimal. In one embodiment, "optimal" can be defined as within a specified margin of error. If yes, the procedure proceeds to 110. If no, the procedure returns to 102 with different measured points until an optimal transformation is found.

In one example, the second phase can be executed by software. The input to this software can include:

A vector of point pairs. The first point in each pair is the target point and the second point is the measured point.

An error limit that controls when the software stops. If the overall error of the chosen points falls below this number, the search and measurement stops and the software returns the computed transformation. This can be used to specify a desired accuracy.

The maximum number of iterations. In case the software can never find a solution fulfilling the error limit, the software terminates after the maximum number of iterations.

The software can output the following parameters:

The affine transformation parameters that the software returns.

A list of points that were used in the final computation. These are the points that were determined to not have moved much and were the selected set for computing the affine transformation.

In one embodiment, a third phase is a user interface. The user interface can execute on a graphics or modeling program and provide the functionality described above. The user interface asks the user to initialize it with two 3D models that have the same number of vertices. In one embodiment, the vertices must share the same labels and be in the same order. For example, the two sets of vertices can be obtained from sequential recording session. These two models will form the target and measured data pair that the above algorithm needs.

In one embodiment, the user has the opportunity to indicate which points on the model are points that should be used in the calculations. For example, if it is known that the actor was talking during the session, the points around the lips do not need to be included in the alignment computations. If the user removes such points before starting the alignment calculation, the algorithm runs faster and more reliably.

In one embodiment, the user can indicate which points in the measured model are untrustworthy. For example, the user can utilize the user interface to paint weights on the measured model. This indicates to the software which points are untrustworthy versus points that are trustworthy as well as a degree of trustworthiness. This has two benefits: it can reduce the amount of time the software needs in its search phase by reducing the number of input points to process. It also allows the software to weight untrustworthy points less than good points, thereby improving results. In addition, if the software completely fails in finding good points for the alignment, the user can force points to be used by painting the appropriate weights.

After this minimal setup, the user initiates the alignment process and within 2-3 seconds the target model is aligned to the reference model. The user interface automatically updates the target object's position so that the user can see and evaluate the accuracy of the solution. For example, the aligned target model can be displayed in 110.

In 112, the procedure can output the optimal affine transformation function to an accessible computer-readable storage medium.

In 114, the procedure can end.

FIG. 2 illustrates an example workstation for removing head motion from facial motion capture data. The workstation 200 can be configured to execute software implementing the techniques discussed above. In one embodiment, the workstation 200 can be configured to communicate with a server as illustrated in FIG. 3 and provide the functionality discussed above.

The workstation 200 can be a computing device such as a personal computer, desktop computer, a laptop computer, a personal digital assistant (PDA), a cellular phone, or other computing device. The workstation 200 is accessible to the user 202 and provides a computing platform for various applications, including a point alignment module 22, discussed below.

The workstation 200 can include a display 204. The display 204 can be physical equipment that displays viewable images and text generated by the workstation 200. For example, the display 204 can be a cathode ray tube or a flat panel display such as a TFT LCD. The display 204 includes a display surface, circuitry to generate a picture from electronic signals sent by the workstation 200, and an enclosure or case. The display 204 can interface with an input/output interface 220, which forwards data from the workstation 200 to the display 204.

The workstation 200 can include one or more output devices 206. The output device 206 can be hardware used to communicate outputs to the user. For example, the output device 206 can include speakers and printers, in addition to the display 204 discussed above.

The workstation 200 can include one or more input devices 208. The input device 208 can be any computer hardware used to translate inputs received from the user 202 into data usable by the workstation 200. The input device 208 can be keyboards, mouse pointer devices, microphones, scanners, video and digital cameras, etc.

The workstation 200 includes an input/output interface 210. The input/output interface 210 can include logic and physical ports used to connect and control peripheral devices, such as output devices 206 and input devices 208. For example, the input/output interface 210 can allow input and output devices 206 and 208 to be connected to the workstation 200.

The workstation 200 includes a network interface 212. The network interface 212 includes logic and physical ports used to connect to one or more networks. For example, the network interface 212 can accept a physical network connection and interface between the network and the workstation by translating communications between the two. Example networks can include Ethernet, the Internet, or other physical network infrastructure. Alternatively, the network interface 212 can be configured to interface with a wireless network. Alternatively, the workstation 200 can include multiple network interfaces for interfacing with multiple networks.

The workstation 200 communicates with a network 214 via the network interface 222. The network 214 can be any network configured to carry digital information. For example, the network 214 can be an Ethernet network, the Internet, a wireless network, a cellular network, or any Local Area Network or Wide Area Network.

The workstation 200 includes a central processing unit (CPU) 216. The CPU 216 can be an integrated circuit configured for mass-production and suited for a variety of computing applications. The CPU 216 can be installed on a motherboard within the workstation 200 and control other workstation components. The CPU 216 can communicate with the other workstation components via a bus, a physical interchange, or other communication channel.

The workstation 200 includes a memory 218. The memory 218 can include volatile and non-volatile memory accessible to the CPU 216. The memory 218 can be random access and store data required by the CPU 216 to execute installed applications. In an alternative embodiment, the CPU 216 can include on-board cache memory for faster performance.

The workstation 200 includes mass storage 220. The mass storage 220 can be volatile or non-volatile storage configured to store data. The mass storage 220 can be accessible to the CPU 216 via a bus, a physical interchange, or other communication channel. For example, the mass storage 220 can be a hard drive, a RAID array, flash memory, CD-ROMs, DVDs, HD-DVD or Blu-Ray mediums.

The workstation 200 can execute a point alignment module 222 implementing the techniques discussed above. In the example of FIG. 2, in operation, the workstation 200 can execute the point alignment module 222 on demand response to a user 202 request. For example, the user request can be received from a user interface discussed above.

FIG. 3 illustrates an example server for removing head motion from facial motion capture data. The server 300 can be configured to execute a volumetric data application utilizing the processes and structures discussed above.

The server 300 includes a display 302. The display 302 can be equipment that displays viewable images, graphics, and text generated by the server 300 to a system administrator or user. For example, the display 302 can be a cathode ray tube or a flat panel display such as a TFT LCD. The display 302 includes a display surface, circuitry to generate a viewable picture from electronic signals sent by the server 300, and an enclosure or case. The display 302 can interface with an input/output interface 308, which converts data from a central processor unit 332 to a format compatible with the display 302.

The server 300 includes one or more output devices 304. The output device 304 can be any hardware used to communicate outputs to the user. For example, the output device 304 can be audio speakers and printers or other devices for providing output to the system administrator.

The server 300 includes one or more input devices 306. The input device 306 can be any computer hardware used to receive inputs from the user. The input device 306 can include keyboards, mouse pointer devices, microphones, scanners, video and digital cameras, etc.

The server 300 includes an input/output interface 308. The input/output interface 308 can include logic and physical ports used to connect and control peripheral devices, such as output devices 304 and input devices 306. For example, the input/output interface 308 can allow input and output devices 304 and 306 to communicate with the server 300.

The server 300 includes a network interface 310. The network interface 310 includes logic and physical ports used to connect to one or more networks. For example, the network interface 310 can accept a physical network connection and interface between the network and the workstation by translating communications between the two. Example networks can include Ethernet, the Internet, or other physical network infrastructure.

Alternatively, the network interface 310 can be configured to interface with a wireless network. Example wireless networks can include Wi-Fi, Bluetooth, cellular, or other wireless networks. It will be appreciated that the server 300 can communicate over any combination of wired, wireless, or other networks.

The server 300 includes a central processing unit (CPU) 312. The CPU 312 can be an integrated circuit configured for mass-production and suited for a variety of computing applications. The CPU 312 can be mounted in a special-design socket on a motherboard within the server 300. The CPU 312 can execute instructions to control other workstation components. The CPU 312 can communicate with the other workstation components via a bus, a physical interchange, or other communication channel.

The server 300 includes a memory 314. The memory 314 can include volatile and non-volatile memory accessible to the CPU 312. The memory can be random access and provide fast access for graphics-related or other calculations. In an alternative, the CPU 312 can include on-board cache memory for faster performance.

The server 300 includes a mass storage 316. The mass storage 316 can be volatile or non-volatile storage configured to store large amounts of data. The mass storage 316 can be accessible to the CPU 312 via a bus, a physical interchange, or other communication channel. For example, the mass storage 316 can be a hard drive, a RAID array, flash memory, CD-ROMs, DVDs, HD-DVD or Blu-Ray mediums.

The server 300 communicates with a network 318 via the network interface 310. The network 310 can be as discussed above. The network 318 can be any network configured to carry digital information. For example, the network interface 310 can communicate over an Ethernet network, the Internet, a wireless network, a cellular data network, or any Local Area Network or Wide Area Network.

The server 300 can store and execute a point alignment module 320 implementing the techniques discussed above. In the example of FIG. 3, in operation, the server 300 can execute the point alignment module 320 to remove head motion from facial motion capture data.

In one embodiment, the process can be divided between the server 300 and a workstation as illustrated in FIG. 2. In this case, the point alignment module 320 can be stored and executed at the server 300, at the workstation, or divided between the two. For example, it can be beneficial to execute processing at the CPU 312 of the server 300, which can be more powerful and include more computing resources.

Figure 4A:
FIG. 4A illustrates an example photo of an actor's face with markers.

FIG. 4A illustrates an example photo of an actor's face with markers. As discussed above, an actor's face is marked with a plurality of markers, the markers denoting significant facial features. In addition, the markers can be placed at facial locations of movement in order to capture facial expression changes. After the actor's face is marked, as illustrated in FIG. 4A, a camera is used to capture facial expression changes from the actor. The markers are used to capture facial motion from the video.

As discussed above, the facial motion capture data is then processed with Horn's orientation/alignment algorithm and RANSAC to produce a facial motion capture data without actor head motions.

FIG. 4B illustrates a first example screen shot of a user interface. The screen shot can be provided to a user at a computing device such as a workstation or a server as illustrated above.

The screen shot includes a vector of point pairs input area 410. A set of target model measured points can be received from the user in a variety of formats. For example, the user can input a location of a file storing the vector of point pairs. The first point in each pair is the target point and the second point is the measured point.

The screen shot includes a maximum number of iterations input area 412. In case the software can never find a solution fulfilling the requested error limit, the software terminates after the maximum number of iterations. This prevents the software from running endlessly.

The screen shot includes an error limit input area 414. The error limit controls when the software stops. If the overall error of chosen points falls below this number, the search and measurement stops and the software returns the computed transformation, as discussed above. This can be used to specify a desired accuracy in an execution.

The screen shot includes a transformation parameter output file input area 416. The software can output a file containing the affine transformation parameters that the software returns.

The screen shot includes a computation points output file input area 418. The software can output a file containing a list of points that were used in the final computation. These are the points that were determined to not have moved much and were the selected set for computing the affine transformation.

The screen shot includes a compute input area 420. When the user has inputted the above information, clicking the area 420 can initiate execution of the above procedures in generating the affine transformation parameters.

FIG. 4C illustrates a second example screen shot of a user interface. The screen shot can be provided to a user at a computing device such as a workstation or a server as illustrated above.

The screen shot includes a target 3D model input area 430. The screen shot includes a measured data pair 3D model input area 432. The two sets of vertices of the two 3D models can be obtained from sequential recording session. These two models will form the target and measured data pair for the processing discussed above.

The screen shot includes a model points to ignore input area 434. The user can indicate which points on the model are points that should be used in the calculations. For example, if it is known that the actor was talking during the session, the points around the lips do not need to be included in the alignment computations. If the user removes such points before starting the alignment calculation, the algorithm runs faster and more reliably. The model points to avoid can be inputted as a list of vertices or via a graphical user interface displaying the available vertices.

The screen shot includes a model point weights input area 436. The user can indicate which points in the measured model are untrustworthy. For example, the user can utilize the user interface to paint weights on the measured model. This indicates to the software which points are untrustworthy versus points that are trustworthy as well as a degree of trustworthiness. This has two benefits: it can reduce the amount of time the software needs in its search phase by reducing the number of input points to process. It also allows the software to weight untrustworthy points less than good points, thereby improving results. In addition, if the software completely fails in finding good points for the alignment, the user can force points to be used by painting the appropriate weights. The model points and their associated weights can be inputted as a list of vertices or via a graphical user interface displaying the available vertices and associated weights.

The screen shot includes a compute input area 438. When the user has inputted the above information, clicking the area 438 can initiate execution of the above procedures in generating the affine transformation parameters.

As discussed above, an example embodiment of the present invention is a method for removing head motion from facial motion capture data. The method includes receiving a set of measured points associated with a facial animation sequence of a target model, wherein each measured point is associated with a three-dimensional coordinate triple. The method includes computing an optimal affine transformation function for reducing head motion from the animation sequence. The computing includes selecting an unprocessed point from the set of measured points. The computing includes selecting two nearby neighboring points of the unprocessed point. The computing includes computing an affine transformation function that minimizes an L2-norm error. The computing includes identifying the optimal affine transformation function from a set of computed affine transformation functions. The method includes displaying an aligned target model and reference model utilizing the optimal affine transformation function. The method includes outputting the optimal affine transformation function. The target model can be a human actor and the measured points are measured from a video recording of marked points on the human actor's face. The measured points can vary with time and represent the facial animation sequence. The affine transformation function can be computed with Horn's solution to minimize the L2-norm error. The optimal affine transformation function can be computed with a RANSAC technique utilizing the unprocessed point and the two nearby neighboring points. The unprocessed point can be randomly selected from the set of measured points. The method includes receiving a user-specified threshold, wherein the optimal affine transformation function produces at least one of: a minimum overall alignment error or an overall alignment error below the user-specified threshold. The method includes receiving a set of user-specified reliable measured points, wherein the unprocessed point is selected from the set of user-specified reliable measured points.

Another embodiment of the present invention can be a server for removing head motion from facial motion capture data. The server includes a computer-readable storage medium. The server includes a processor in communication with the computer-readable storage medium, the processor configured to execute a method. The method includes receiving a set of measured points associated with a facial animation sequence of a target model, wherein each measured point is associated with a three-dimensional coordinate triple. The method includes computing an optimal affine transformation function for reducing head motion from the animation sequence. The computing includes selecting an unprocessed point from the set of measured points. The computing includes selecting two nearby neighboring points of the unprocessed point. The computing includes computing an affine transformation function that minimizes an L2-norm error. The computing includes identifying the optimal affine transformation function from a set of computed affine transformation functions. The method includes displaying an aligned target model and reference model utilizing the optimal affine transformation function. The method includes outputting the optimal affine transformation function. The target model can be a human actor and the measured points are measured from a video recording of marked points on the human actor's face. The measured points can vary with time and represent the facial animation sequence. The affine transformation function can be computed with Horn's solution to minimize the L2-norm error. The optimal affine transformation function can be computed with a RANSAC technique utilizing the unprocessed point and the two nearby neighboring points. The unprocessed point can be randomly selected from the set of measured points. The method includes receiving a user-specified threshold, wherein the optimal affine transformation function produces at least one of: a minimum overall alignment error or an overall alignment error below the user-specified threshold. The method includes receiving a set of user-specified reliable measured points, wherein the unprocessed point is selected from the set of user-specified reliable measured points.

Another embodiment of the present invention can be a computer-readable storage medium including instructions adapted to execute a method for removing head motion from facial motion capture data. The method includes receiving a set of measured points associated with a facial animation sequence of a target model, wherein each measured point is associated with a three-dimensional coordinate triple. The method includes computing an optimal affine transformation function for reducing head motion from the animation sequence. The computing includes selecting an unprocessed point from the set of measured points. The computing includes selecting two nearby neighboring points of the unprocessed point. The computing includes computing an affine transformation function that minimizes an L2-norm error. The computing includes identifying the optimal affine transformation function from a set of computed affine transformation functions. The method includes displaying an aligned target model and reference model utilizing the optimal affine transformation function. The method includes outputting the optimal affine transformation function. The target model can be a human actor and the measured points are measured from a video recording of marked points on the human actor's face. The measured points can vary with time and represent the facial animation sequence. The affine transformation function can be computed with Horn's solution to minimize the L2-norm error. The optimal affine transformation function can be computed with a RANSAC technique utilizing the unprocessed point and the two nearby neighboring points. The unprocessed point can be randomly selected from the set of measured points. The method includes receiving a user-specified threshold, wherein the optimal affine transformation function produces at least one of: a minimum overall alignment error or an overall alignment error below the user-specified threshold. The method includes receiving a set of user-specified reliable measured points, wherein the unprocessed point is selected from the set of user-specified reliable measured points.

The specific embodiments described in this document represent examples or embodiments of the present invention, and are illustrative in nature rather than restrictive. In the above description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" or "some embodiments" means that a particular feature, structure, or characteristic described in connection with the embodiment is included in at least one embodiment of the present invention. Features and aspects of various embodiments may be integrated into other embodiments, and embodiments illustrated in this document may be implemented without all of the features or aspects illustrated or described. It will be appreciated to those skilled in the art that the preceding examples and embodiments are exemplary and not limiting.

While the system, apparatus and method have been described in terms of what are presently considered to be the most practical and effective embodiments, it is to be understood that the disclosure need not be limited to the disclosed embodiments. It is intended that all permutations, enhancements, equivalents, combinations, and improvements thereto that are apparent to those skilled in the art upon a reading of the specification and a study of the drawings are included within the true spirit and scope of the present invention. The scope of the disclosure should thus be accorded the broadest interpretation so as to encompass all such modifications and similar structures. It is therefore intended that the application includes all such modifications, permutations and equivalents that fall within the true spirit and scope of the present invention.

What is claimed is:

1. A processor-implemented method for reducing error between motion capture sessions, comprising:

receiving a first and a second set of measured points, the first set of measured points from a first motion capture session and associated with a first set of facial skin markers of a target model in a first facial animation sequence of the target model, the second set of measured points from a second motion capture session and associated with a second set of facial markers of the target model in a second facial animation sequence of the target model, wherein each measured point is associated with a three-dimensional coordinate triple;

computing, by a computer system including a processor, an optimal affine transformation function for reducing error between the motion capture sessions, wherein the computing includes,
  selecting an unprocessed point from the first set of measured points, the unprocessed point being a point of the first set of measured points that has not been used to compute any affine transformation function to minimize an error,
  selecting two nearby neighboring points of the unprocessed point,
  computing, as part of aligning the first set of measured points with the second set of measured points to reduce error between the motion capture sessions, an affine transformation function that minimizes an L2-norm error, and
  identifying the optimal affine transformation function from a set of computed affine transformation functions; and
generating, by the computer system and utilizing the optimal affine transformation function, a head motion animation sequence.

2. The method of claim 1, wherein the target model is a human actor and the measured points are measured from a video recording of marked points on the human actor's face, the marked points being associated with the facial markers.

3. The method of claim 2, wherein the measured points vary with time and represent the facial animation sequence.

4. The method of claim 1, wherein the affine transformation function is computed with Horn's solution to minimize the L2-norm error.

5. The method of claim 1, wherein the optimal affine transformation function is computed with a RANSAC technique utilizing the unprocessed point and the two nearby neighboring points.

6. The method of claim 5, wherein the unprocessed point is randomly selected from those points of the first set of measured points that have not been used to compute any affine transformation function to minimize an error.

7. The method of claim 1, further comprising:
  receiving a user-specified threshold, wherein the optimal affine transformation function produces at least one of: a minimum overall alignment error or an overall alignment error below the user-specified threshold.

8. The method of claim 1, further comprising:
  receiving a set of user-specified reliable measured points, wherein the unprocessed point is selected from those points of the set of user-specified reliable measured points that have not been used to compute any affine transformation function to minimize an error.

9. A server system for reducing error between motion capture sessions, comprising:
  a computer-readable storage medium, and
  a processor in communication with the computer-readable storage medium, the processor configured to execute a method including,
    receiving a first and a second set of measured points, the first set of measured points from a first motion capture session and associated with a first set of facial skin markers of a target model in a first facial animation sequence of the target model, the second set of measured points from a second motion capture session and associated with a second set of facial markers of the target model in a second facial animation sequence of the target model, wherein each measured point is associated with a three-dimensional coordinate triple,
    computing an optimal affine transformation function for reducing error between motion capture sessions, wherein the computing includes,
      selecting an unprocessed point from the first set of measured points, the unprocessed point being a point of the first set of measured points that has not been used to compute any affine transformation function to minimize an error,
      selecting two nearby neighboring points of the unprocessed point,
      computing, as part of aligning the first set of measured points with the second set of measured points to reduce error between motion capture sessions, an affine transformation function that minimizes an L2-norm error, and
      identifying the optimal affine transformation function from a set of computed affine transformation functions; and
    generating, utilizing the optimal affine transformation function, a head motion animation sequence.

10. The server system of claim 9, wherein the target model is a human actor and the measured points are measured from a video recording of marked points on the human actor's face, the marked points being associated with the facial markers.

11. The server system of claim 10, wherein the measured points vary with time and represent the facial animation sequence.

12. The server system of claim 9, wherein the affine transformation function is computed with Horn's solution to minimize the L2-norm error.

13. The server system of claim 9, wherein the optimal affine transformation function is computed with a RANSAC technique utilizing the unprocessed point and the two nearby neighboring points.

14. The server system of claim 13, wherein the unprocessed point is randomly selected from those points of the set of measured points that have not been used to compute any affine transformation function to minimize an error.

15. The server system of claim 9, the method further including:
  receiving a user-specified threshold, wherein the optimal affine transformation function produces at least one of: a minimum overall alignment error or an overall alignment error below the user-specified threshold.

16. The server system of claim 9, the method further including:
  receiving a set of user-specified reliable measured points, wherein the unprocessed point is selected from those points of the set of user-specified reliable measured points that have not been used to compute any affine transformation function to minimize an error.

17. A non-transitory computer-readable medium having executable programming instructions stored thereon to execute a method for reducing error between motion capture sessions, the method comprising:
  receiving a first set and a second set of measured points, the first set of measured points from a first motion capture session and associated with a first set of facial skin markers of a target model in a first facial animation sequence of the target model, the second set of measured points from a second motion capture session and associated with a second set of facial skin markers of the target model in a second facial animation sequence of the target model, wherein each measured point is associated with a three-dimensional coordinate triple;

computing an optimal affine transformation function for reducing error between the motion capture sessions, wherein the computing includes,
  selecting an unprocessed point from the first set of measured points, the unprocessed point being a point of the first set of measured points that has not been used to compute any affine transformation function to minimize an error,
  selecting two nearby neighboring points of the unprocessed point,
  computing, as part of aligning the first set of measured points with the second set of measured points to reduce error between the motion capture sessions, an affine transformation function that minimizes an L2-norm error, and
  identifying the optimal affine transformation function from a set of computed affine transformation functions; and
  generating, utilizing the optimal affine transformation function, a head motion animation sequence.

18. The medium of claim 17, wherein the target model is a human actor and the measured points are measured from a video recording of marked points on the human actor's face, the marked points being associated with the facial markers.

19. The medium of claim 18, wherein the measured points vary with time and represent the facial animation sequence.

20. The medium of claim 17, wherein the affine transformation function is computed with Horn's solution to minimize the L2-norm error.

21. The medium of claim 17, wherein the optimal affine transformation function is computed with a RANSAC technique utilizing the unprocessed point and the two nearby neighboring points.

22. The medium of claim 21, wherein the unprocessed point is randomly selected from those points of the set of measured points that have not been used to compute any affine transformation function to minimize an error.

23. The medium of claim 17, the method further comprising:
  receiving a user-specified threshold, wherein the optimal affine transformation function produces at least one of: a minimum overall alignment error or an overall alignment error below the user-specified threshold.

24. The medium of claim 17, the method further comprising:
  receiving a set of user-specified reliable measured points, wherein the unprocessed point is selected from those points of the set of user-specified reliable measured points that have not been used to compute any affine transformation function to minimize an error.

* * * * *